US005475771A

United States Patent [19]

Hosoi

[11] Patent Number: 5,475,771

[45] Date of Patent: Dec. 12, 1995

[54] POLARIZATION SPLITTER HAIVNG AN ANISOTROPIC OPTICAL WAVEGUIDE

[75] Inventor: Toru Hosoi, Tokyo, Japan

[73] Assignee: NEC Corporation, Tokyo, Japan

[21] Appl. No.: 221,575

[22] Filed: Apr. 1, 1994

[30] Foreign Application Priority Data

Apr. 2, 1993 [JP] Japan .................................... 5-077225

[51] Int. Cl.$^6$ ........................................ G02B 6/10

[52] U.S. Cl. ............................... 385/11; 385/45; 385/129

[58] Field of Search ................................ 385/11, 14, 31, 385/45, 129, 130, 132, 29

[56] References Cited

U.S. PATENT DOCUMENTS

| | | | |
|---|---|---|---|
| 4,943,131 | 7/1990 | Taki | 385/29 |
| 5,011,248 | 4/1991 | Taki | 385/11 |
| 5,319,494 | 6/1994 | Miyaguchi et al. | 385/11 |
| 5,420,949 | 5/1995 | Arima et al. | 385/11 X |

OTHER PUBLICATIONS

"Integrated optic adiabatic polarization splitter on silicon", by Y. Shani et al., Applied Physics Letters, vol. 56, No. 2, Jan. 8, 1990 pp. 120–121.

"A TE–TM Mode Splitter in $LiNbO_3$ by Proton Exchange and Ti Diffusion", by N. Goto et al., Journal of Lightwave Technology, vol. 7, No. 10, Oct. 1989 pp. 1567–1574.

"Buried Optical Waveguide Polarizer by Titanium Indiffusion and Proton–Exchange in $LiNbO_3$", by P. Jiang, IEEE Photonics Technology Letters, vol. 4, No. 8, Aug. 1992 pp. 881–883.

"A Polarization Splitter on $LiNbO_3$ Using Only Titanium Diffusion", by J. J. G. M. Van Der Tol et al., Journal of Lightwave Technology, vol. 9, No. 7, Jul. 1991 pp. 879–886.

*Primary Examiner*—John D. Lee
*Assistant Examiner*—Phan T. H. Palmer
*Attorney, Agent, or Firm*—Sughrue, Mion, Zinn, Macpeak & Seas

[57] ABSTRACT

A polarization splitter comprises an optical waveguide formed on a substrate and having an S-shaped curve portion, for permitting propagation of two linearly polarized lights orthogonal to each other therethrough, and an anisotropic optical waveguide branching from the beginning of the S-shaped curve portion, into which is guided one of the two linearly polarized lights alone.

2 Claims, 1 Drawing Sheet

POLARIZATION SPLITTER HAIVNG AN ANISOTROPIC OPTICAL WAVEGUIDE

BACKGROUND OF THE INVENTION

1. Field of the Invention

This invention relates to a polarization splitter, and more particularly to a polarization splitter of waveguide type having an anisotropic optical waveguide.

2. Prior Art

Lithium niobate $LiNbOb_3$ is widely used as a material for substrates of waveguide-type optical functional elements, because of its large electro-optical effect and large electro-mechanical coupling coefficient. An optical waveguide using a substrate made of lithium niobate has anisotropy in the refractive index, and therefore the functional element using it operates in a manner dependent on polarization. Therefore, an element is required for splitting polarized lights (TE and TM lights).

As a conventional polarization splitter, the following are known. FIG. 1 is a plan view of a polarization splitter described in Journal of Lightwave Technology Vol. 7, No. 10, pp 1567–1574, 1989. As shown in the figure, on a Z-cut X axis-propagating lithium niobate substrate 21, there is formed a Y branch optical waveguide which comprises a Ti indiffusion (TI) optical waveguide 22 and a proton exchange (PE) optical waveguide 23. The polarized lights (the TE mode and the TM mode) are excited into respective higher-order modes at a taper region extending in a tapered form and comprised of two kinds of optical waveguides into which the input waveguide is about to be bifurcated. The higher-order modes excited propagate through the optical waveguide with different field distributions due to the difference in the effective refractive indexes thereof sensitive to the optical waveguide. Then, at the bifurcating point, the higher order modes propagate into respective optical waveguides different from each other, since the higher modes of the polarized lights agree with the fundamental modes of same in the optical waveguides, respectively. That is, the TM mode propagates into the branch of the proton exchange optical waveguide 23, and the TE mode into the branch of the titanium indiffusion optical waveguide 22, whereby a polarization splitting operation is achieved.

In the conventional polarization splitter element described above, since the perturbation of the modes is utilized in splitting the polarized lights, there are problems of (a): the polarization-splitting characteristics are degraded for a light with a wide range of wavelength since the polarization-splitting ratio varies with the wavelength of the light, and (b): a fabrication tolerance of the Y branch is close or strict, since the polarization-splitting ratio largely depends on a branching angle of the Y branch.

SUMMARY OF THE INVENTION

It is an object of the invention to provide a polarization splitter having a polarization-splitting function which is wavelength-independent and has a polarization-splitting ratio free from dependency on a branching angle of the splitter.

To attain the above object, the present invention provides a polarization splitter comprising an optical waveguide formed on a dielectric substrate and having an S-shaped curve portion, for permitting propagation of a linearly polarized light having electric field components vertical or horizontal to the substrate and an anisotropic optical waveguide branching from the beginning of the S-shaped curve portion for permitting propagation of one of the components of said linearly polarized light therethrough.

According to the polarization splitter of the present invention, a polarized light component which does not propagate through the anisotropic optical waveguide guided as it has been through the S-shaped optical waveguide, and the polarized light component orthogonal thereto is guided from a bifurcation of the S-shaped curve portion and the anisotropic optical waveguide, into the anisotropic optical waveguide, thereby realizing a polarization-splitting function. This action of the polarization splitter of the invention does not utilize the perturbation of polarization modes, and therefore, it is wavelength-independent, and the S-shaped portion makes the polarization-splitting ratio free from dependency on the branching angle.

Preferably, lithium niobate or lithium tantalate is used for the dielectric substrate, particularly preferably, lithium niobate.

The above and other objects, features, and advantages of the invention will become more apparent from the following detailed description taken in conjunction with the accompanying drawings.

DETAILED DESCRIPTION OF THE PREFERRED EMBODIMENT

Figure 1:
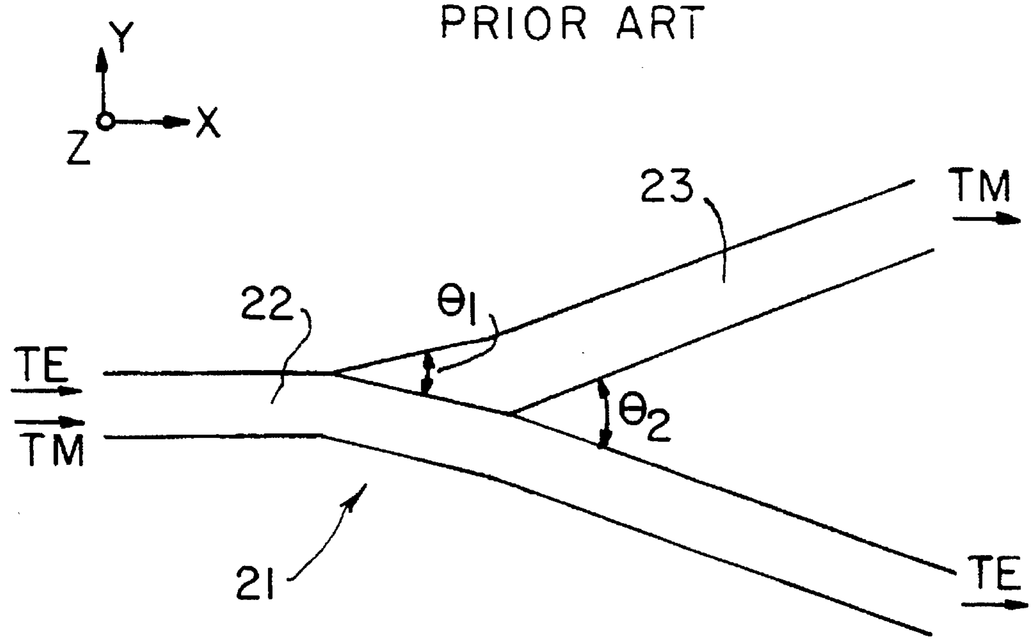
FIG. 1 shows a plan view for explaining the prior art.
Figure 2:
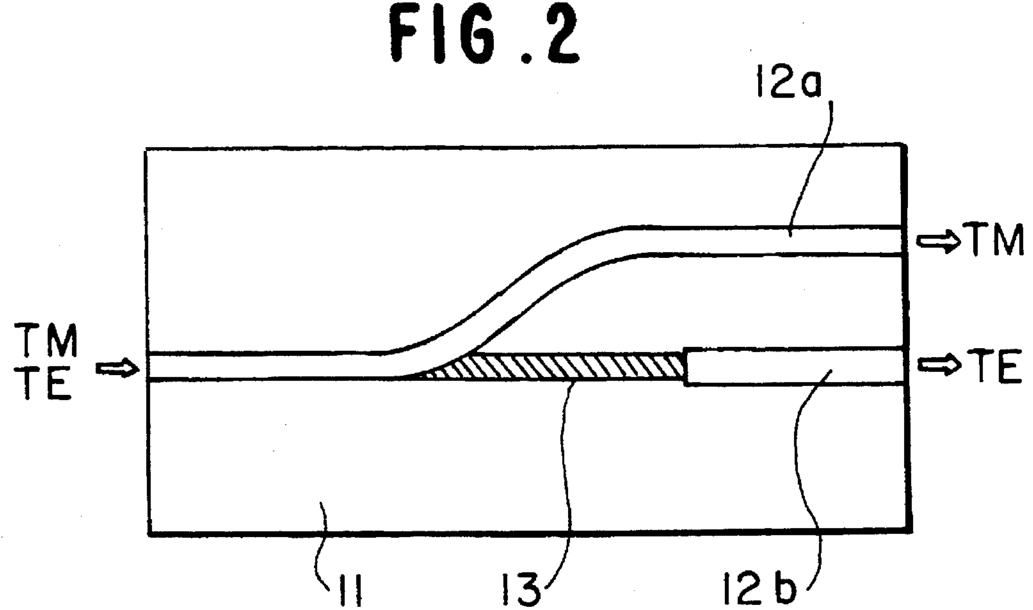
FIG. 2 shows a plan view for explaining a polarization splitter according to an embodiment of the invention.

Next, the invention will be described in detail with reference to a drawing showing a preferred embodiment thereof. FIG. 2 shows a polarization splitter according to an embodiment of the invention. As shown in the figure, on a X-cut Y axis-propagating lithium niobate substrate 11, there is formed a pattern of an S-shaped optical waveguide and a linear or straight optical waveguide both made of a titanium thin layer having a width of 6 to 12 μm, and a thickness of 600 to 2000 Å, followed by subjecting the pattern to thermal diffusion to form single mode titanium indiffusion (TI) optical waveguides **12*a* and 12*b***.

Then, a branch of an anisotropic optical waveguide branching from the beginning of the S curve portion is formed by the proton exchange (PE) method. More specifically, the surface of the lithium niobate substrate is masked except an area having a shape of the optical waveguide to be formed, and the resulting substrate is immersed into a solution of benzoic acid at a temperature within a range of 200° to 400° C. for several ten minutes, followed by thermal treatment. In this manner, the proton exchange (PE) optical waveguide 13 is completed, which is connected to the optical waveguide **12*b***.

Amounts of changes $\Delta n_e$ and $\Delta n_o$ in the surface refractive index of the extraordinary ray and the ordinary ray caused the titanium indiffusion (TI) method are approximately +0.012 to +0.004, respectively. In contrast, in the case of an optical waveguide formed by the proton exchange (PE) method, they exhibit great variations with the maximum values of the $\Delta n_e$=+0.12 and $\Delta n_o$=−0.04. Moreover, only the amount of change $\Delta n_e$ alone changes to an increasing direction. In general, lights have a property of tendency to preferentially propagate through a medium having a higher refractive index, and therefore the ordinary ray (the TM mode) is not guided into the proton exchange (PE) optical waveguide 13, but propagates along the S-shaped optical waveguide as it has been. In contrast, the extraordinary ray (the TE mode) shifts into the proton exchange optical waveguide exhibiting a large change in the surface refractive index to propagate therethrough. As described heretofore, of the random polarized light incident to the optical waveguide 12*a*, the TM mode component propagates through the optical waveguide 12*a* to an output port thereof, while the TE mode component is guided via the proton exchange optical waveguide 13 into the optical waveguide 12*b* to propagate therethrough to an output port thereof, whereby the polarization splitting is achieved.

Although, in the above embodiment, description has been made on a case where lithium niobate is used as the material of a substrate, this is not limitative, and other dielectric materials, such as lithium tantalate, may be used, so long as they exhibit a large difference in the refractive index between the extraordinary ray and the ordinary ray when subjected to the proton exchange.

As described heretofore, according to the invention, an optical waveguide formed on a substrate and having an S-shaped curve portion, for permitting propagation of two linearly polarized lights orthogonal to each other therethrough, is provided with an anisotropic optical waveguide branching from the beginning of the S-shaped curve portion, into which is guided one of the two linearly polarized lights alone. This makes it possible to obtain a polarization splitter having effects of (a): variation in the polarization-splitting ratio relative to the wavelength of the light for propagation can be made slight, and (b): degradation of the splitting ratio due to a fabrication error of the branching angle ceases to occur, enabling a high polarization-splitting ratio to be obtained constantly. These effects are very advantageous in that it is possible to guarantee a high polarization-splitting ratio over a wide range of wavelength of the light in an integrated optical circuit which necessitates the polarization-splitting function, and provide a polarization splitter having a large fabrication tolerance.

What is claimed is:

1. A polarization splitter comprising:

an optical waveguide formed on a dielectric substrate and having an S-shaped curve portion, for permitting propagation of a linearly polarized light having electric field components vertical or horizontal to said substrate; and an anisotropic optical waveguide branching from and formed adjacent to the beginning of said S-shaped curve portion but not overlay said S-shaped curve portion for permitting propagation of one of said components of said linearly polarized light therethrough.

2. The polarization splitter according to claim 1, wherein lithium niobate is used for said dielectric substrate.

* * * * *